US008676967B2

(12) United States Patent
Nishiyama

(10) Patent No.: US 8,676,967 B2
(45) Date of Patent: Mar. 18, 2014

(54) EVENT PROXY NOTIFICATION APPARATUS AND METHOD OF CONTROLLING THE SAME AND PROGRAM

(75) Inventor: Masashi Nishiyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 422 days.

(21) Appl. No.: 12/983,497

(22) Filed: Jan. 3, 2011

(65) Prior Publication Data

US 2011/0167151 A1 Jul. 7, 2011

(30) Foreign Application Priority Data

Jan. 5, 2010 (JP) .................................. 2010-000796

(51) Int. Cl.
*G06F 15/16* (2006.01)
(52) U.S. Cl.
USPC ........................................................ 709/224
(58) Field of Classification Search
USPC ................................................. 709/223, 224
See application file for complete search history.

(56) References Cited

U.S. PATENT DOCUMENTS

| 7,737,826 | B2 * | 6/2010 | Tamura | .................... 340/286.02 |
| 7,840,666 | B2 | 11/2010 | Wada | |
| 2002/0126701 | A1 * | 9/2002 | Requena | ........................ 370/469 |
| 2008/0059978 | A1 * | 3/2008 | Nishio | ........................... 719/318 |
| 2008/0066083 | A1 * | 3/2008 | Ladd et al. | ..................... 719/318 |

FOREIGN PATENT DOCUMENTS

| JP | 2008-059483 | 3/2008 |
| JP | 2008-097582 | 4/2008 |
| JP | 2007-293503 | 11/2008 |

* cited by examiner

*Primary Examiner* — Wing F Chan
*Assistant Examiner* — Andrew Woo
(74) *Attorney, Agent, or Firm* — Fitzpatrick, Cella, Harper & Scinto

(57) ABSTRACT

When a notification request for an event is received from a client apparatus, information about the type of the event, an event notification apparatus, and the client apparatus included in the notification request are registered. Upon reception of issuance of an event from an event notification apparatus, it is determined whether the event notification apparatus, the type of the event, and a client apparatus that has requested notification of the event have been registered. If it is determined that the event notification apparatus, the type of the event, and the client apparatus have been registered with respect to the event, the event is transmitted to the registered client apparatus.

5 Claims, 20 Drawing Sheets

FIG. 4

| ID | UUID | VERSION | DEVICE TYPE | MODEL NAME | DEVICE NAME | URL | IP ADDRESS | XML SAVE PATH |
|---|---|---|---|---|---|---|---|---|
| 1 | 123456 | 1 | Printer | LBPXXXX | Dev Printer | http://192.168.0.1/wsd/mex | 192.168.0.1 | C:¥temp/123·· |
| 2 | 987654 | 1 | Printer | LBPYYYY | Sales Printer | http://192.168.0.2/wsd/mex | 192.168.0.2 | C:¥temp/987·· |
| 3 | abcdef | 1 | MFP | MFPXXXX | Dev MFP | http://192.168.0.3/wsd/mex | 192.168.0.3 | C:¥temp/abc·· |

401 402 403 404 405 406 407 408 409

F I G. 5

```
<Envelope>
   <Header>
      <Action>Hello</Action>
      <MessageID>1</MessageID>                        501
      <To>urn:discovery</To>
   </Header>
   <Body>
      <Hello>
         <EndpointReference>
            <Address>urn:uuid:123456</Address>
         </EndpointReference>
         <Types>MFP</Types>                           502
         <XAddrs>http://192.168.0.1/wsd/mex</XAddrs>
         <MetadataVersion>1</MetadataVersion>
      </Hello>
   </Body>
</Envelope>
```

FIG. 7A

```
<Envelope>
    <Header>
        <Action>Get</Action>
        <MessageID>1</MessageID>
        <To>urn:uuid:123456</To>
    </Header>
    <Body/>
</Envelope>
```

FIG. 7B

```
<Envelope>
  <Header>
    <Action>GetResponse</Action>
    <MessageID>1</MessageID>
    <To>anonymous</To>
  </Header>
  <Body>
    <Metadata>
      <MetadataSection>
        <ThisDevice>
          <FriendlyName>Dev Printer</FriendlyName>
          <FirmwareVersion>1.00</FirmwareVersion>
          <SerialNumber>1111</SerialNumber>
        </ThisDevice>
      </MetadataSection>                                          }701
      <MetadataSection>
        <ThisModel>
          <Manufacturer>Xxxxx</Manufacturer>
          <ManufacturerUrl>http://www.xxxxx.com</ManufacturerUrl>
          <PresentationUrl>http://192.168.0.1</PresentationUrl>   }702
          <ModelName>LBPXXXX</ModelName>
        </ThisModel>
      </MetadataSection>
      <MetadataSection>
        <Relationship>
          <Hosted>
            <EndpointReference>
              <Address>http://192.168.0.1/wsd/print</Address>
            </EndpointReference>                                  }703
            <Types>PrinterServiceType</Types>
            <ServiceId>uri:123456</ServiceId>
          </Hosted>
        </Relationship>
      </MetadataSection>
    </Metadata>
  </Body>
</Envelope>
```

FIG. 9A

```
<Envelope>
  <Header>
    <Action>Probe</Action>
    <MessageID>1</MessageID>
    <To>urn:discovery</To>
  </Header>
  <Body>
    <Probe>
      <Types>DeviceProxy</Types>
    </Probe>
  </Body>
</Envelope>
```

FIG. 9B

```
<Envelope>
  <Header>
    <Action>ProbeMatch</Action>
    <MessageID>1</MessageID>
    <To>anonymous</To>
  </Header>
  <Body>
    <ProbeMatches>
      <ProbeMatch>
        <EndpointReference>
          <Address>urn:uuid:123456</Address>
        </EndpointReference>
        <Types>DeviceProxy</Types>
        <XAddrs>http://192.168.1.1/wsd/deviceproxy</XAddrs>
        <MetadataVersion>1</MetadataVersion>
      </ProbeMatch>
    </ProbeMatches>
  </Body>
</Envelope>
```

901 (braces the ProbeMatch block)

FIG. 11

```
<Envelope>
  <Header>
    <Action>ProbeMatch</Action>
    <MessageID>1</MessageID>
    <To>anonymous</To>
  </Header>
  <Body>
    <ProbeMatches>
      <ProbeMatch>
        <EndpointReference>
          <Address>urn:uuid:123456</Address>
        </EndpointReference>
        <Types>Printer</Types>
        <XAddrs>http://192.168.1.1/wsd/deviceproxy</XAddrs>
        <MetadataVersion>1</MetadataVersion>
      </ProbeMatch>                                              ⎬1101
      <ProbeMatch>
        <EndpointReference>
          <Address>urn:uuid:987654</Address>
        </EndpointReference>
        <Types>Printer</Types>
        <XAddrs>http://192.168.1.1/wsd/deviceproxy</XAddrs>
        <MetadataVersion>1</MetadataVersion>
      </ProbeMatch>                                              ⎬1102
    </ProbeMatches>
  </Body>
</Envelope>
```

F I G. 12
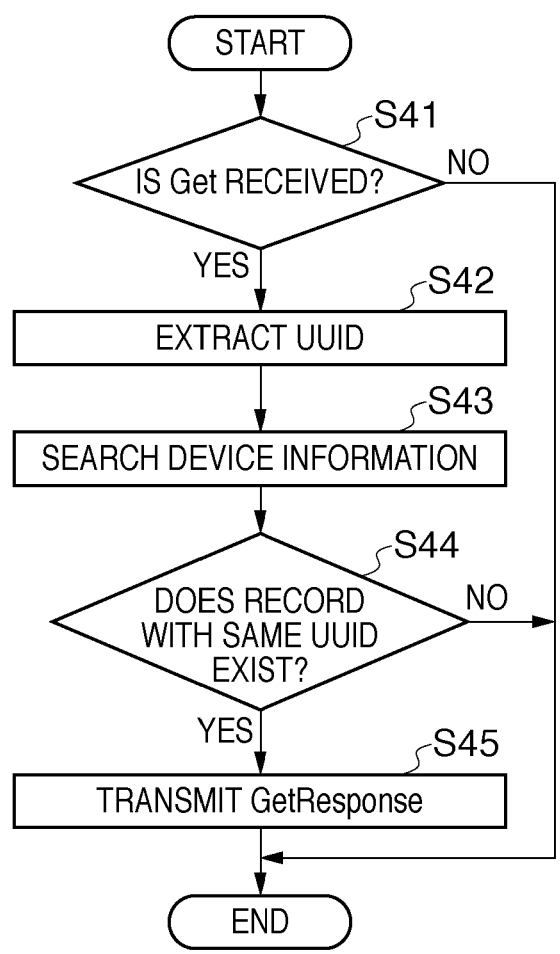

F I G. 13

```
<Envelope>
  <Header>
    <Action>GetResponse</Action>
    <MessageID>1</MessageID>
    <To>anonymous</To>
  </Header>
  <Body>
    <Metadata>
      <MetadataSection>
        <ThisDevice>
          <FriendlyName>Dev Printer</FriendlyName>
          <FirmwareVersion>1.00</FirmwareVersion>
          <SerialNumber>1111</SerialNumber>
        </ThisDevice>
      </MetadataSection>
      <MetadataSection>
        <ThisModel>
          <Manufacturer>Xxxxx</Manufacturer>
          <ManufacturerUrl>http://www.xxxxx.com</ManufacturerUrl>
          <PresentationUrl>http://192.168.0.1</PresentationUrl>
          <ModelName>LBPXXXX</ModelName>
        </ThisModel>
      </MetadataSection>
      <MetadataSection>
        <Relationship>
          <Hosted>
            <EndpointReference>
              <Address>http://192.168.0.1/wsd/print</Address>
            </EndpointReference>
            <Types>PrinterServiceType</Types>
            <ServiceId>uri:123456</ServiceId>
          </Hosted>
          <Hosted>
            <EndpointReference>
              <Address>http://192.168.1.1/Printer/StatusEvent</Address>
            </EndpointReference>                                                    }1301
            <Types>DeviceProxyEventingServiceType</Types>
            <ServiceId>uri:123456</ServiceId>
          </Hosted>
        </Relationship>
      </MetadataSection>
    </Metadata>
  </Body>
</Envelope>
```

FIG. 14A

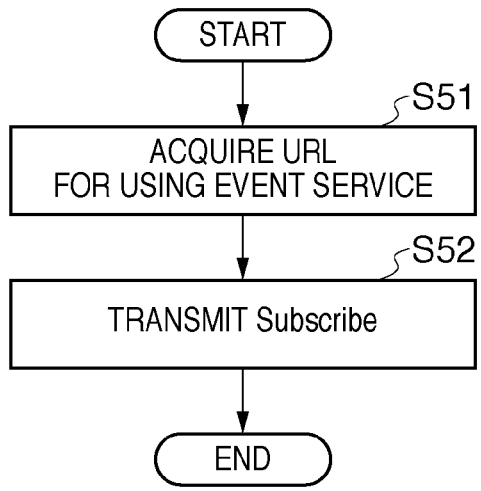

FIG. 14B

```
<s12:Envelope
   xmlns:a12="http://www.w3.org/2003/05/soap-envelope"
   xmlns:wsa="http://schemas.xmlsoap.org/ws/2004/08/addressing"
   xmlns:wse="http://schemas.xmlsoap.org/ws/2004/08/eventing"
   xmlns:ew="http://www.example.com/warnings" >
  <s12:Header>
   <wsa:Action>
     http://schemas.xmlsoap.org/ws/2004/08/eventing/Subscribe
   </wsa:Action>
   <wsa:MessageID>
     uuid:d7c5726b-de29-4313-b4d4-b3425b200839
   </wsa:MessageID>
   <wsa:ReplyTo>
    <wsa:Address>http://www.example.com/MyEventSink</wsa:Address>
   </wsa:ReplyTo>                                                        }1402
   <wsa:To>http://192.168.0.1/wsd/print</wsa:To>
  </s12:Header>
  <s12:Body>
   <wse:Subscribe>
    <wse:Delivery>
     <wse:NotifyTo>
      <wsa:Address>
       http://www.example.com/MyEventSink/OnStormWarning
      </wsa:Address>
      <wsa:ReferenceProperties>
       <ew:MySubscription>2597</ew:MySubscription>
      </wsa:ReferenceProperties>
     </wse:NotifyTo>
    </wse:Delivery>
    <wse:Filter Dialect="http://www.example.org/mfp-check/PrinterStatusEvent" > }1401
    </wse:Filter>
   </wse:Subscribe>
  </s12:Body>
</s12:Envelope>
```

F I G. 16

| ID | EVENT REGISTRATION DESTINATION URL | EVENT NOTIFICATION DESTINATION URL | EVENT TYPE |
|---|---|---|---|
| 1 | http://192.168.0.1/wsd/print | http://pc001.co.jp | PrinterStatusEvent |
| 2 | | http://pc002.co.jp | ScannerStatusEvent |
| 3 | | http://pc003.co.jp | PrinterStatusEvent |
| 4 | | http://pc004.co.jp | PrinterStatusEvent |
| 5 | | http://pc005.co.jp | PrinterStatusEvent |
| 6 | | http://pc006.co.jp | PrinterStatusEvent |
| 7 | http://192.168.0.2/wsd/print | http://pc001.co.jp | PrinterStatusEvent |
| 8 | | http://pc001.co.jp | PrinterStatusEvent |

FIG. 17

```
<s12:Envelope
  xmlns:a12="http://www.w3.org/2003/05/soap-envelope"
  xmlns:wsa="http://schemas.xmlsoap.org/ws/2004/08/addressing"
  xmlns:wse="http://schemas.xmlsoap.org/ws/2004/08/eventing"
  xmlns:ew="http://www.example.com/warnings" >
 <s12:Header>
  <wsa:Action>
    http://schemas.xmlsoap.org/ws/2004/08/eventing/Subscribe
  </wsa:Action>
  <wsa:MessageID>
    uuid:d7c5726b-de29-4313-b4d4-b3425b200839
  </wsa:MessageID>
  <wsa:ReplyTo>
   <wsa:Address>http://192.168.1.1/wsd/deviceproxy</wse:Address>
  </wsa:ReplyTo>
  <wsa:To>http://192.168.0.1/wsd/print</wsa:To>
 </s12:Header>
 <s12:Body>
  <wse:Subscribe>
   <wse:Delivery>
    <wse:NotifyTo>
     <wsa:Address>
      http://www.example.com/MyEventSink/OnStormWarning
     </wsa:Address>
     <wsa:ReferenceProperties>
      <ew:MySubscription>2597</ew:MySubscription>
     </wsa:ReferenceProperties>
    </wse:NotifyTo>
   </wse:Delivery>
   <wse:Filter Dialect="http://www.example.org/mfp-check/PrinterStatusEvent" >
   </wse:Filter>
   <wse:Filter Dialect="http://www.example.org/mfp-check/ScannerStatusEvent" >
   </wse:Filter>
  </wse:Subscribe>
 </s12:Body>
</s12:Envelope>
```

F I G. 21
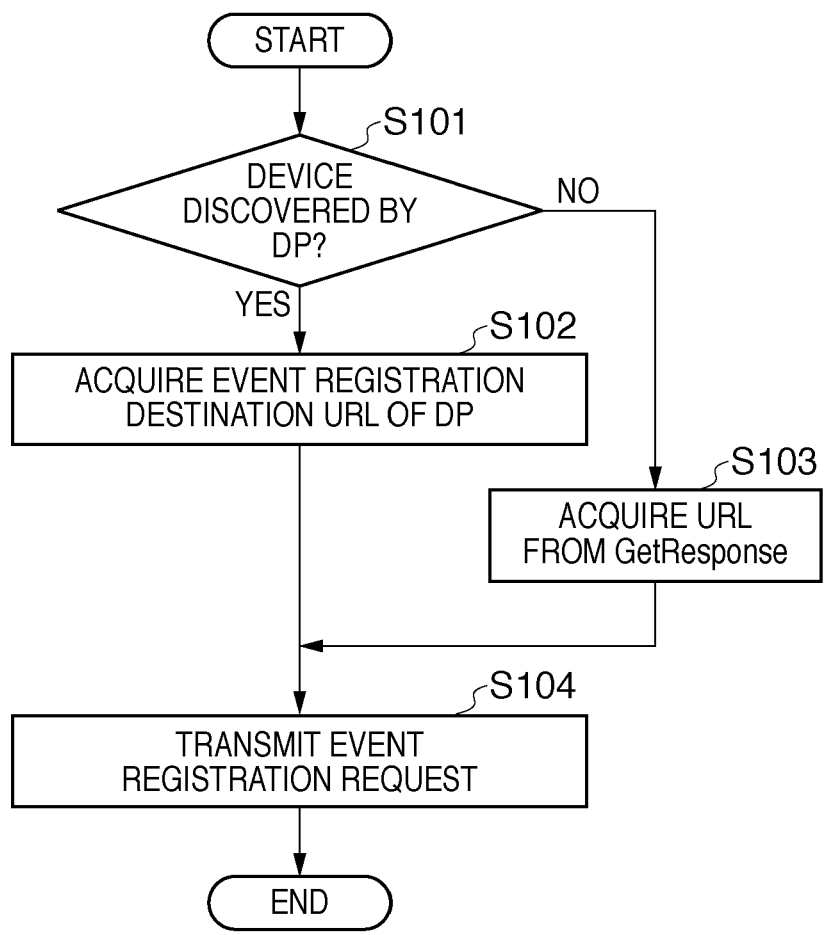

EVENT PROXY NOTIFICATION APPARATUS AND METHOD OF CONTROLLING THE SAME AND PROGRAM

BACKGROUND OF THE INVENTION

1. Field of the Invention

The present invention relates to an event proxy notification apparatus that acts as proxy to provide an event notification, and a method of controlling the same and a program for the same.

2. Description of the Related Art

A variety of devices have become networked with the progress in network technologies, so that various sorts of network-capable hardware, besides conventional personal computers (hereinafter referred to as PCs), have been developed. As a result, devices ranging from image forming devices such as a printer to home electrical products have rapidly been made network-capable. Due to this diversity of types of devices existing in networks, software and techniques for improving the convenience and simplicity in using such devices have become important.

For example, software for discovering a device that provides a desired service, and software for detecting events, including a processing status of a requested job and a status change such as an update of configuration information, are known. One example is a standard technique called WSD (Web Service on Devices). WSD uses WS-Discovery in searching a network for a device. WSD also uses WS-Eventing as a technique for providing notifications of events such as a processing status of a job, an error status, and an update of configuration information. Such techniques allow discovery of various devices existing in a network, as well as real-time recognition of device statuses, providing for the efficient use of available printers and quick and smooth troubleshooting on the occurrence of a failure.

As a trend in these days, networks become larger and an increasing number of client devices exist in a network. If the number of client devices that use events is enormous due to an increased-scale network, a heavy load is imposed on an apparatus that provides event notifications (hereinafter referred to as an event notification apparatus) such as an image forming device. For an event notification protocol like WS-Eventing, a client device such as a PC has to perform registration for requesting notification of events (hereinafter referred to as event registration) in advance with the event notification apparatus. On the occurrence of an event, the event notification apparatus has to provide a notification of the event to all client devices that have performed the event registration. Among such events, events related to status changes involved in executing a job include events such as the start of the job, a progress of the job, the completion of the job, and an error. To provide notifications of the occurrence of these events to all the client devices that have performed the event registration, network connections need to be secured one by one for each client device, which is a process imposing an extremely heavy load. This has caused inconveniences such as a significant reduction in performance of job execution in the event notification apparatus.

To solve such inconveniences, in Japanese Patent Laid-Open No. 2008-097582, the load on an event notification apparatus is reduced by increasing an event monitoring interval in the event notification apparatus to reduce the frequency of occurrences of event notification processes depending on the number of client devices to be notified of events. According to this technique described in Japanese Patent Laid-Open No. 2008-097582, the load on the event notification apparatus can be reduced. However, since the event monitoring interval is increased in the event notification apparatus, the client devices cannot be notified of all events when events occur at short intervals.

In Japanese Patent Laid-Open No. 2008-059483, the load on an event notification apparatus is reduced by providing an event notification only to client devices ready to perform an event reception process and thereby eliminating unnecessary event notification processes. According to this technique described in Japanese Patent Laid-Open No. 2008-059483, the load on the event notification apparatus can be reduced. However, if many client devices are ready to perform the event reception process, the load on the event notification apparatus is not reduced.

In Japanese Patent Laid-Open No. 2007-293503, at the time of event registration, a client device specifies a transmission protocol for use in event notification. Depending on the number of client devices registered as event notification destinations, event registration is rejected if a transmission protocol involving a heavy processing load such as TCP is specified. According to this technique described in Japanese Patent Laid-Open No. 2007-293503, the load on the event notification apparatus can be reduced. However, the number of client devices as event notification destinations is limited.

SUMMARY OF THE INVENTION

An aspect of the present invention is to eliminate the above-mentioned problems with conventional technology.

The present invention is characterized by providing a technique of reducing the load involved in an event notification process of an event notification apparatus and appropriately notifying a client device of an event.

According to an aspect of the present invention, there is provided an event proxy notification apparatus for notifying a client apparatus of issuance of an event upon receiving the issuance of the event from an event notification apparatus, comprising: a registration unit that registers, upon receiving a notification request for an event from a client apparatus, information about a type of the event, an event notification apparatus, and the client apparatus included in the notification request; a determination unit that determines, upon receiving issuance of an event from an event notification apparatus, whether the event notification apparatus, the type of the event, and the client apparatus that has requested notification of the event have been registered by the registration unit; and an event notification unit that transmits the event to the client apparatus registered by the registration unit if the determination unit determines that the event notification apparatus, the type of the event, and the client apparatus have been registered.

According to another aspect of the present invention, there is provided a method of controlling an event proxy notification apparatus for notifying a client apparatus of issuance of an event upon receiving the issuance of the event from an event notification apparatus, comprising: a registration step of registering, upon receiving a notification request for an event from a client apparatus, information about a type of the event, an event notification apparatus, and the client apparatus included in the notification request; a determination step of determining, upon receiving issuance of an event from an event notification apparatus, whether the event notification apparatus, the type of the event, and the client apparatus that has requested notification of the event have been registered in the registration step; and an event notification step of transmitting the event to the client apparatus registered in the registration step if it is determined in the determination step that the event notification apparatus, the type of the event, and the client apparatus have been registered.

Further features and aspects of the present invention will become apparent from the following description of exemplary embodiments, with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a diagram showing an exemplary device information table held by the DP or the client PC;

FIG. 5 is a diagram showing an exemplary Hello message;

FIG. 7A is a diagram showing an exemplary Get message;

FIG. 7B is a diagram showing an exemplary GetResponse message;

FIG. 9A is a diagram showing an exemplary Probe message;

FIG. 9B is a diagram showing an exemplary ProbeMatch message;

FIG. 11 is a diagram showing an exemplary ProbeMatch message;

FIG. 12 is a flowchart describing a process where the DP receives a Get message from the PC;

FIG. 13 is a diagram showing an exemplary GetResponse message transmitted from the DP to the PC;

FIG. 14A is a flowchart describing a procedure in which the PC performs an event registration process for a device discovered by device search;

FIG. 14B is a diagram showing an exemplary Subscribe request transmitted from the PC to the DP;

FIG. 16 is a diagram showing an exemplary device management table held by the DP;

FIG. 17 is a diagram showing an exemplary Subscribe request transmitted to the image forming device;

FIG. 21 is a flowchart describing a procedure of a process in which the PC performs event registration according to a third embodiment.

DESCRIPTION OF THE EMBODIMENTS

Embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
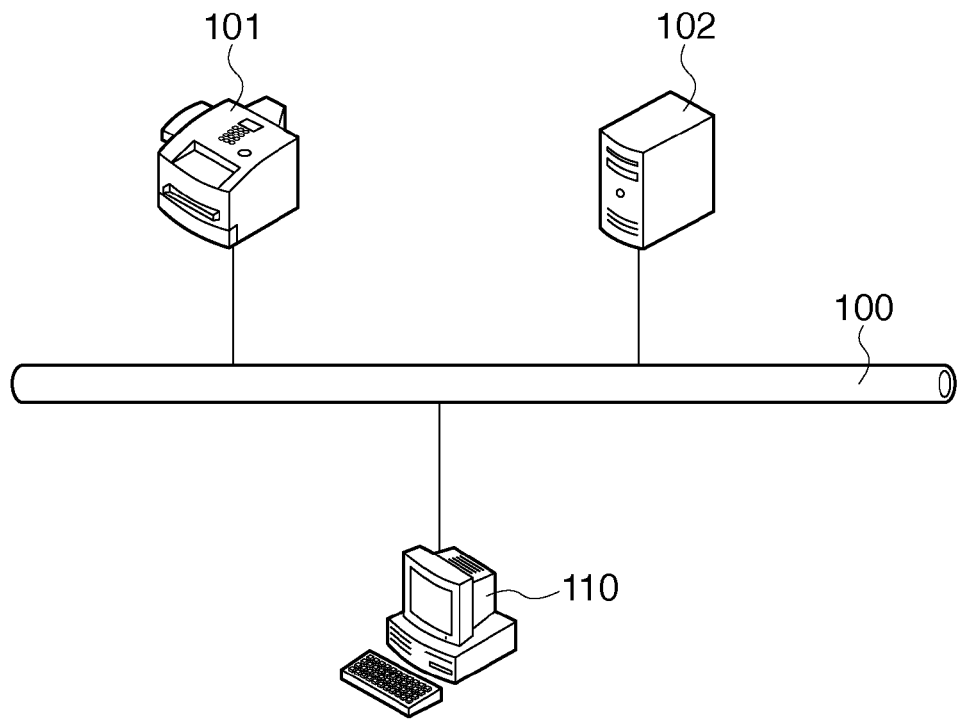
FIG. 1 is a diagram showing a configuration of a communication system according to embodiments of the present invention.

FIG. 1 is a diagram showing a configuration of a communication system according to embodiments of the present invention.

An image forming device 101, a discovery proxy server (hereinafter referred to as a DP) 102, and a client PC 110 are connected to a network 100. The DP 102 functions as an event proxy communication device that provides a notification of the occurrence of events in the image forming device 101 in place of the image forming device 101. The network 100 is typically implemented as a LAN but may take other network forms such as a WAN.

Figure 2:
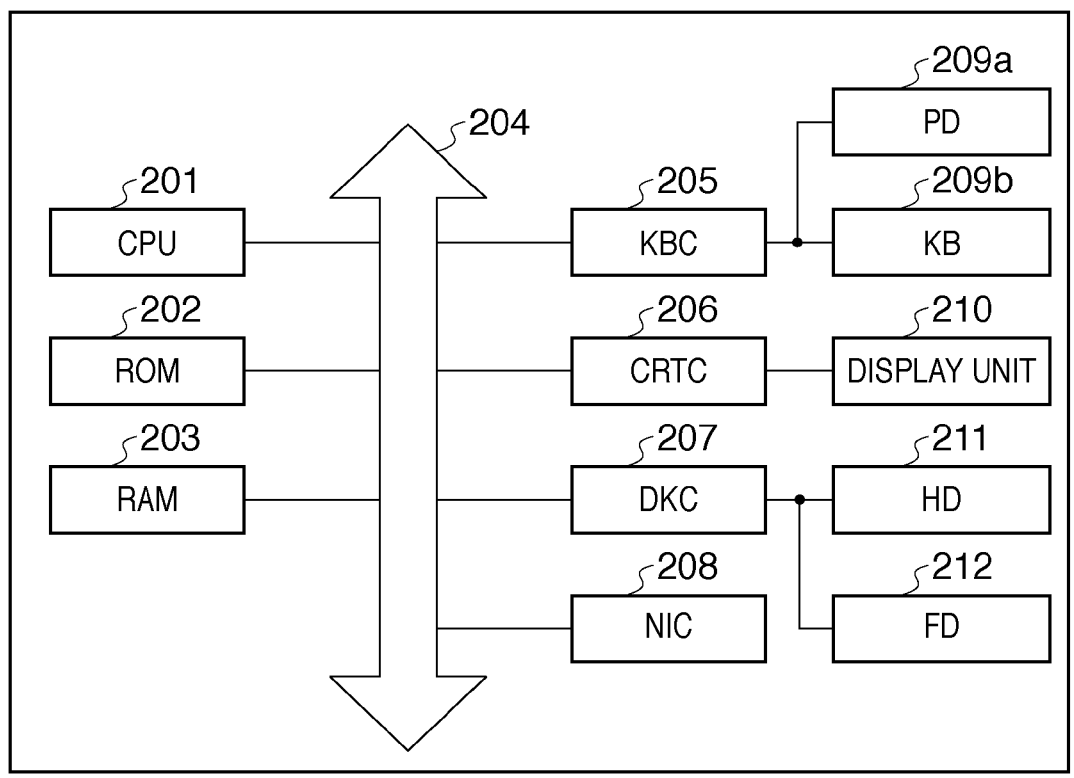
FIG. 2 is a block diagram showing a hardware configuration of a DP (Discovery Proxy Server) and a client PC.

FIG. 2 is a block diagram showing a hardware configuration of the DP 102 and the client PC 110. The DP 102 and the client PC 110 are basically the same in configuration and may be general-purpose PCs (Personal Computers), for example.

In FIG. 2, a CPU 201 controls various devices connected to a system bus 204. A ROM 202 stores a BIOS and a boot program. A RAM 203 is used as main memory for the CPU 201. A keyboard controller (KBC) 205 performs control related to input of information etc. from a pointing device (PD) 209a such as a mouse and from a keyboard (KB) 209b. A display controller (CRTC) 206, having internal video memory, performs rendering into the video memory under instructions from the CPU 201 and also outputs image data rendered in the video memory to the display unit 210 as video signals. The display unit 210 may be of any type, such as a CRT or LCD display unit. A disk controller (DKC) 207 provides accesses to a hard disk (HD) 211 and a floppy (R) disk 212. A network interface card (NIC) 208 connects to the network 100 and communicates information via the network 100. The HD 211 stores an OS (Operating System), various application programs operating on the OS, and the like. With the above configuration, upon power-on of the apparatus (the DP 102 or the client PC 110), the CPU 201 reads the OS from the HD 211 into the RAM 203 according to the boot program stored in the ROM 202 to thereby cause the apparatus to function as an information processing apparatus. Programs (applications) loaded from the HD 211 into the RAM 203 under the control of the OS are used to perform processes to be described below.

Figure 3:
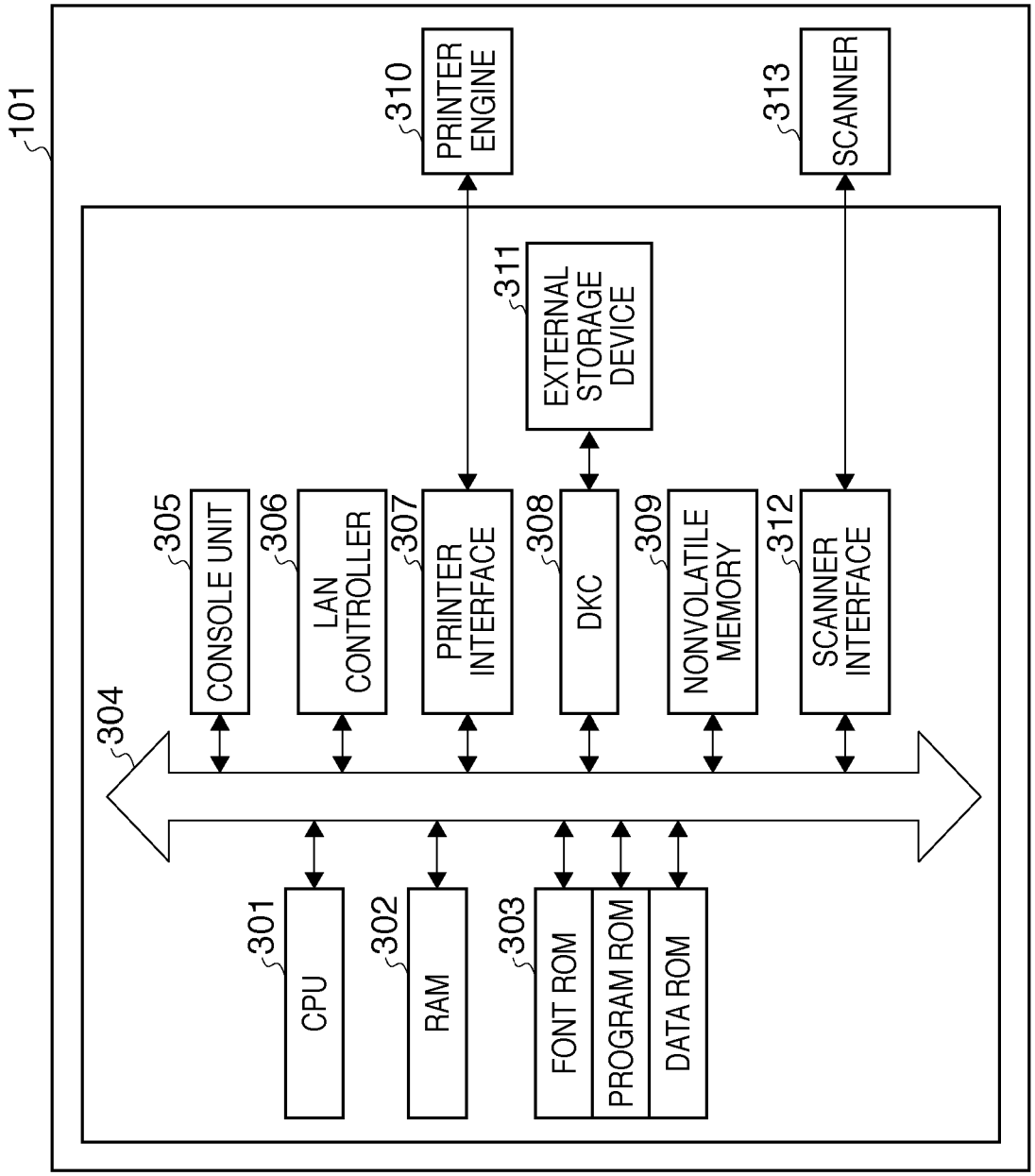
FIG. 3 is a block diagram showing a hardware configuration of an image forming device according to the embodiments.

FIG. 3 is a block diagram showing a hardware configuration of the image forming device 101 according to the embodiments. Description here is made for a case where the image forming device 101 is a multi function peripheral (MFP), by way of example.

A CPU 301 centrally controls accesses to and from various devices connected to a system bus 304 based on control programs stored in a program ROM in a ROM 303. The CPU 301 also outputs image signals as output information to a print unit (a printer engine) 310 connected via a printer interface 307, and inputs image signals from a reader unit (a scanner) 313 connected via a scanner interface 312. The program ROM in the ROM 303 stores programs such as control programs executable by the CPU 301. Further, a font ROM in the ROM 303 stores data such as font data (including outline font data) used in generating the output information to be output to the printer engine 310. A data ROM in the ROM 303 stores information used by devices such as PCs that use the image forming device 101. The CPU 301 can perform communication processing with devices such as PCs in the network 100 via a LAN controller 306. A RAM 302 functions mainly as main memory and a work area for the CPU 301 and is configured to allow the memory capacity to be expanded by optional RAM connected to an expansion port (not shown). The RAM 302 is also used as areas such as a loading area for the output information and a storage area for environmental data. An external storage device (HD) 311 has its accesses controlled by a disk controller (DKC) 308. The HD 311 is used as an area for storing data such as font data, emulation programs, and form data, and used as a job storage area in which a print job is temporarily spooled to be externally controlled. The HD 311 is further used as a BOX data storage area in which image data read by the scanner 313 and image data of a print job are held as BOX data to be referred to or printed via the network 100. A console unit 305 is used for displaying a message to a user and for allowing a user to input various sorts of information. A nonvolatile memory 309 stores various sorts of setting information that is set through the console unit 305. Further, although not shown, various expansion devices can be optionally attached to the image forming device 101, such as a finisher that performs stapling and sorting functions, and a double-sided printing device for providing a double-sided printing function. The operation of such expansion devices is controlled by the CPU 301.

FIG. 4 is a diagram showing an exemplary device information table held in the HD 211 of the DP 102 or the client PC 110 according to the embodiments.

The device information table holds information about devices (such as an image forming device) as records in the DP 102 or the client PC 110. Each record includes an ID 401, a UUID 402, a version 403, a device type 404, a model name 405, a device name 406, a URL 407, an IP address 408, and an XML save path 409. The ID 401 indicates an ID (identification information) for identifying a device. The UUID (Universally Unique Identifier) 402 indicates a UUID for globally identifying the device. The version 403 indicates the version of the device information. The device type 404 is information indicating the type, such as "MFP" meaning a multi function device or "Printer" meaning a printer. The model name 405 indicates the model name of the device, such as "LBPXXXX." The device name 406 indicates a name assigned to the device by a device manager. The URL (Uniform Resource Locator) 407 indicates a URL for acquiring device information. The IP address (Internet Protocol Address) 408 indicates the IP address of the device. The XML save path 409 is information indicating a location in the HD 211 at which GetResponse data (to be described later) acquired from the device is saved. The device information table allows the DP 102 and the client PC 110 to manage devices available via the network 100.

Upon power-on of the image forming device 101, the CPU 301 of the image forming device 101 signals its existence to the DP 102 by unicasting a Hello message in XML format as shown in FIG. 5.

FIG. 5 is a diagram showing an exemplary Hello message.

The Hello message comprises a header section 501 enclosed in <Header> tag pairs and a body section 502 enclosed in <Body> tag pairs, and the entire message is enclosed in <Envelope> tag pairs. This structure is common to all messages used in the embodiments. The header section 501 serves as a common header independent of the message content and includes an <Action> tag, a <MessageID> tag, and a <To > tag. The <Action> tag is for identifying the message type. The <MessageID> tag is an identifier for uniquely identifying the message. The <To > tag is for identifying the destination of the message. In the example of FIG. 5, the destination of the message is set to the DP 102.

The body section 502 varies in structure depending on message content. In FIG. 5, the <Body> tag is followed by a <Hello> tag, indicating that this message is a Hello message. The <Hello> tag contains an <EndpointReference> tag, a <Types> tag, an <XAddrs> tag, and a <MetadataVersion> tag. The <EndpointReference> tag contains an <Address> tag, which describes address information identifying the device. The <Types> tag describes type information about the device (in this example, "MFP"). The <XAddrs> tag describes a URL for acquiring device information. The <MetadataVersion> tag describes the version of the device information.

Figure 6:
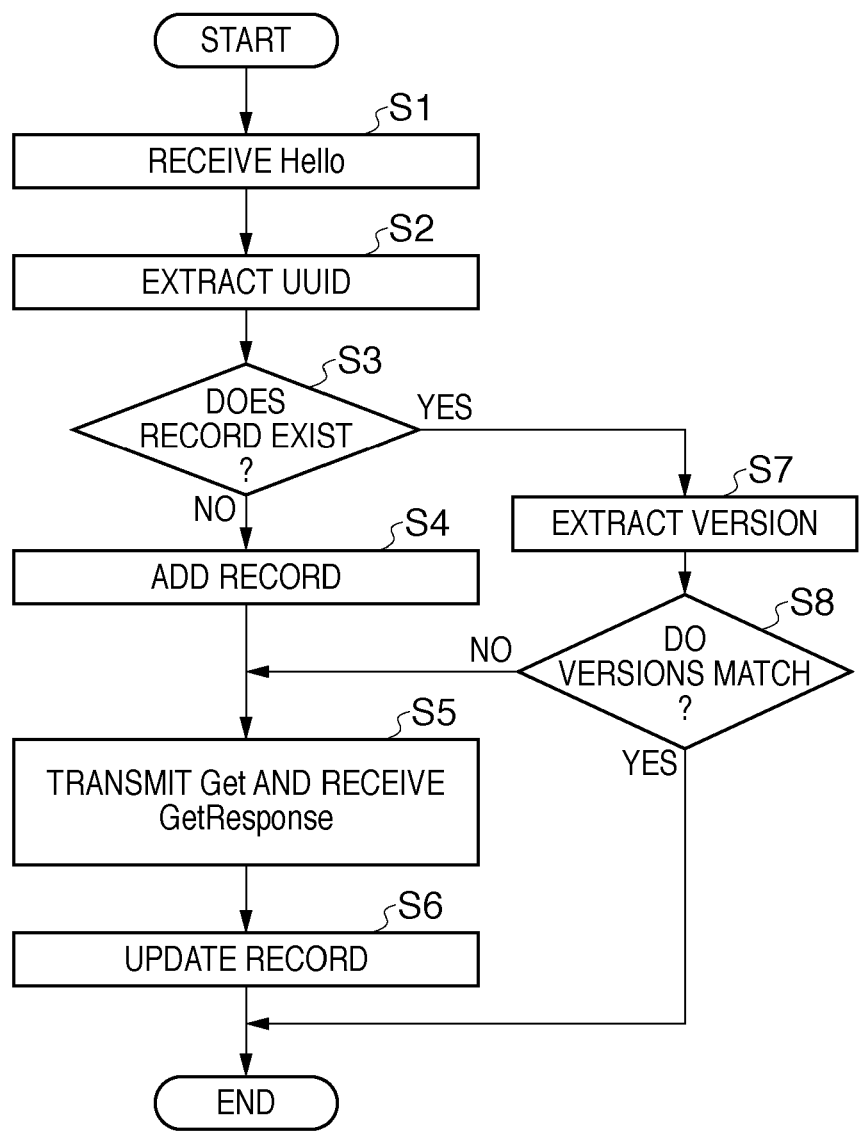
FIG. 6 is a flowchart showing a process in which the DP registers device information.

FIG. 6 is a flowchart describing a process in which the DP 102 registers device information according to the embodiments. This process is implemented by the CPU 201 of the DP 102 executing a program loaded into the RAM 203 of the DP 102 at runtime.

First, in step S1, the CPU 201 receives a Hello message as described above. The process proceeds to step S2, where the CPU 201 extracts, as the UUID for globally identifying a device, the value of the <Address> tag in the <EndpointReference> tag from the Hello message. In the example of FIG. 5, the UUID is "123456." The process proceeds to step S3, where the CPU 201 determines whether a record with the same UUID as the UUID extracted in S2 exists in the device information table (FIG. 4) stored in the HD 211. If it is determined that such a record does not exist, the process proceeds to S4. In step S4, the CPU 201 adds a new record to the device information table stored in the HD 211. In this example, the value of the <Types> tag (in FIG. 5, "MFP") is extracted as the device type from the received Hello message. The value of the <MetadataVersion> tag (In FIG. 5, "1") is extracted as the version of the device information, and the value of the <XAddrs> tag is extracted as the URL for acquiring the device information. In FIG. 5, this URL is "http://192.168.0.1/wsd/mex." The extracted values are added to the new record in the device information table stored in the HD 211. The IP address of the sender of the Hello message is also added to the new record in the device information table. The process proceeds to step S5, where the CPU 201 transmits a Get message to the URL extracted from the <XAddrs> tag. In a first embodiment, this URL is the IP address of the image forming device 101.

If it is determined in step S3 that a record with the same UUID as the UUID extracted in step S2 is stored in the HD 211, the process proceeds to step S7. In step S7, the CPU 201 extracts the version information from the Hello message. In step S8, the CPU 201 determines whether the extracted version information is the same as the version information in the record with the same UUID. If the versions are different from each other, the process proceeds to step S5. If the versions are the same, the process terminates without further operation.

FIG. 7A is a diagram showing an exemplary Get message issued from the DP 102 to the image forming device 101 in step S5 of FIG. 6.

The Get message is a message only with the header section. An <Action> tag in the header section indicates that this message is a Get message. When the CPU 301 of the image forming device 101 receives the Get message, the CPU 301 transmits a GetResponse message as shown in FIG. 7B to the DP 102.

Here, if the CPU 301 of the image forming device 101 determines that the Get message is received, the image forming device 101 responds to the DP 102 by acquiring information about the device itself recorded in the HD 311 (FIG. 3) and generating the GetResponse message.

FIG. 7B is a diagram showing an exemplary GetResponse message.

The GetResponse message has a structure such that the body section includes the device information indicated by a <Metadata> tag.

The <Metadata> tag contains MetadataSection sections 701, 702, and 703 indicated by <MetadataSection> tags. The type of information in each MetadataSection section is specified by a tag that follows. The MetadataSection section 701 has a <ThisDevice> tag, which describes information varying with the device. A <FriendlyName> tag indicates a name assigned to the device, a <FirmwareVersion> tag indicates the firmware version of the device, and a <SerialNumber> tag indicates the serial number of the device. The MetadataSection section 702 has a <ThisModel> tag, which describes information varying with the device model. A <Manufacturer> tag indicates a manufacturer name for the device, and a <ManufacturerUrl> tag indicates the URL of the device manufacturer. A <PresentationUrl> tag indicates information about the device, and a <ModelName> tag indicates the model name of the device. The MetadataSection section 703 has a <Relationship> tag, which describes information about an internal service of the device.

In the first embodiment, the internal service is a print service provided by the image forming device 101. The <Relationship> tag is further followed by a <Hosted> tag, which contains an <EndpointReference> tag, a <Types> tag, and a <ServiceId> tag. The <EndpointReference> tag contains an <Address> tag, which describes address information for using the service. The <Types> tag describes type information about the service. The <ServiceId> tag describes an identifier for identifying the service within the device.

Thus, in step S6, from the GetResponse message received from the image forming device 101, the CPU 201 extracts the value of the <FriendlyName> tag as the device name, and the value of the <ModelName> tag as the model name. These extracted values are used to update the relevant record in the device information table (FIG. 4) stored in the HD 211. The XML data itself of the received GetResponse message is also stored in the HD 211 (FIG. 2), and a file path to the stored XML data is saved as the XML save path 409 in the device information table stored in the HD 211.

Figure 8:
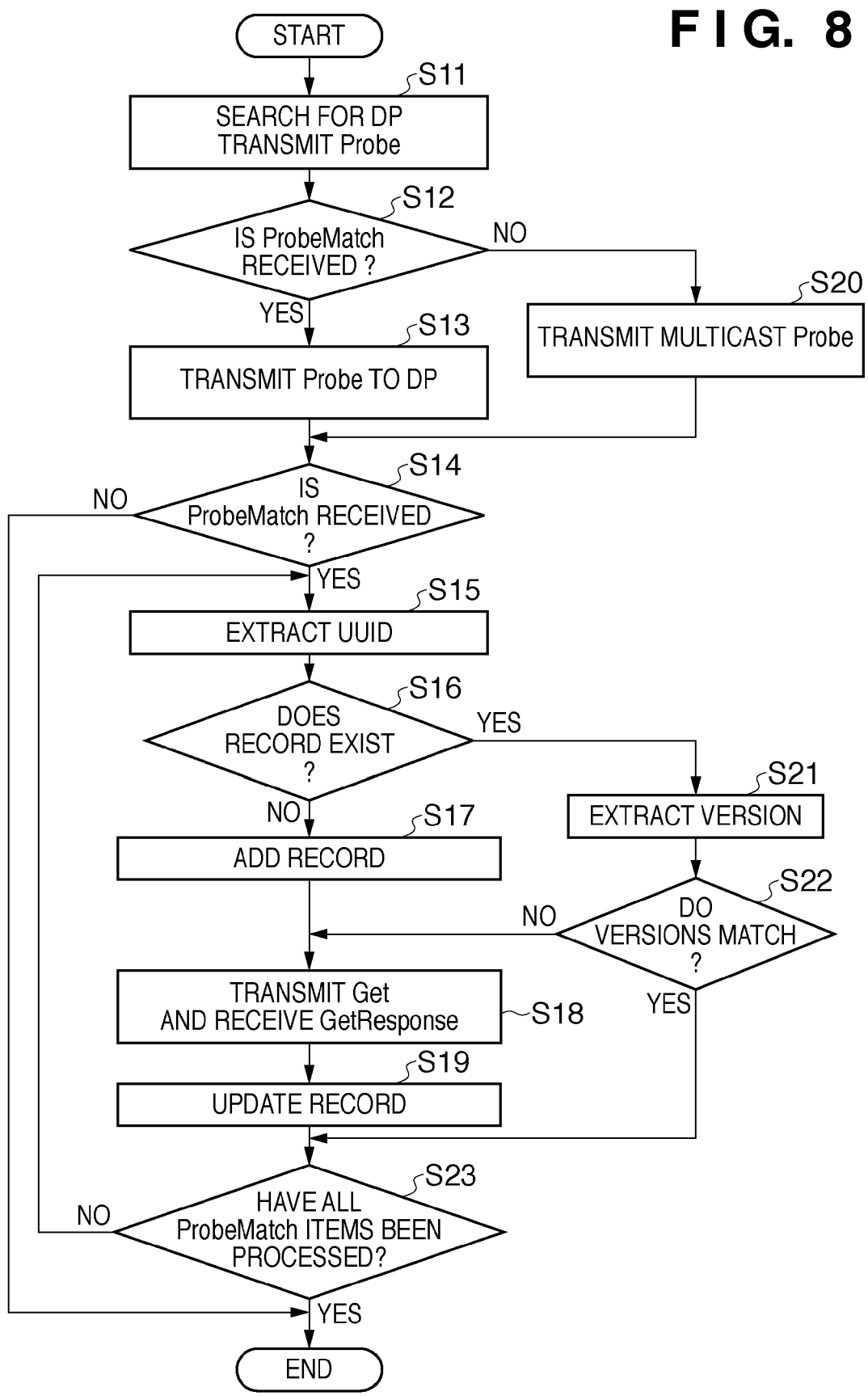
FIG. 8 is a flowchart describing a procedure of a device search process of the client PC.

FIG. 8 is a flowchart describing a procedure of a device search process of the client PC 110 according to the first embodiment. A program for performing this process has been loaded into the RAM 203 of the PC 110 at runtime and is executed under the control of the CPU 201 of the PC 110.

First, in step S11, the CPU 201 of the client PC 110 multicasts a Probe message (a search request) as shown in FIG. 9A to search for the DP 102.

FIG. 9A is a diagram showing an exemplary Probe message.

The Probe message has a <Probe> tag in the body section, indicating that this message is a Probe message. The <Probe> tag contains a <Types> tag, which describes "DeviceProxy" indicating the DP 102.

The DP 102, having received the Probe message, extracts the <Types> tag in the Probe message and determines whether the DP 102 itself corresponds to the "DeviceProxy." If it is determined that the DP 102 itself corresponds to the "DeviceProxy," the DP 102 transmits a ProbeMatch message shown in FIG. 9B to the client PC 110.

FIG. 9B is a diagram showing an exemplary ProbeMatch message (a search result).

The ProbeMatch message has a <ProbeMatches> tag in the body section, indicating that this message is a ProbeMatch message. The <ProbeMatches> tag contains a ProbeMatch section 901 indicated by a <ProbeMatch> tag. The ProbeMatch section 901 corresponds to one search result and indicates that information about the discovered DP 102 is returned.

The process proceeds to step S12. If the CPU 201 of the client PC 110 receives the ProbeMatch message from the DP 102 in step S12, the process proceeds to step S13. In step S13, the CPU 201 unicasts a Probe message to a URL extracted from an <XAddrs> tag in the ProbeMatch message.

Here, the Probe message specifies "Printer" in the <Types> tag, indicating that a printer device is searched for.

If the ProbeMatch message is not received in step S12, this suggests that the DP 102 does not exist in the network 100. Therefore, the process proceeds to step S20, where the CPU 201 multicasts a Probe message that specifies "Printer" in the <Types> tag. Thus, the CPU 201 searches for a device for itself without using the DP 102.

Figure 10:
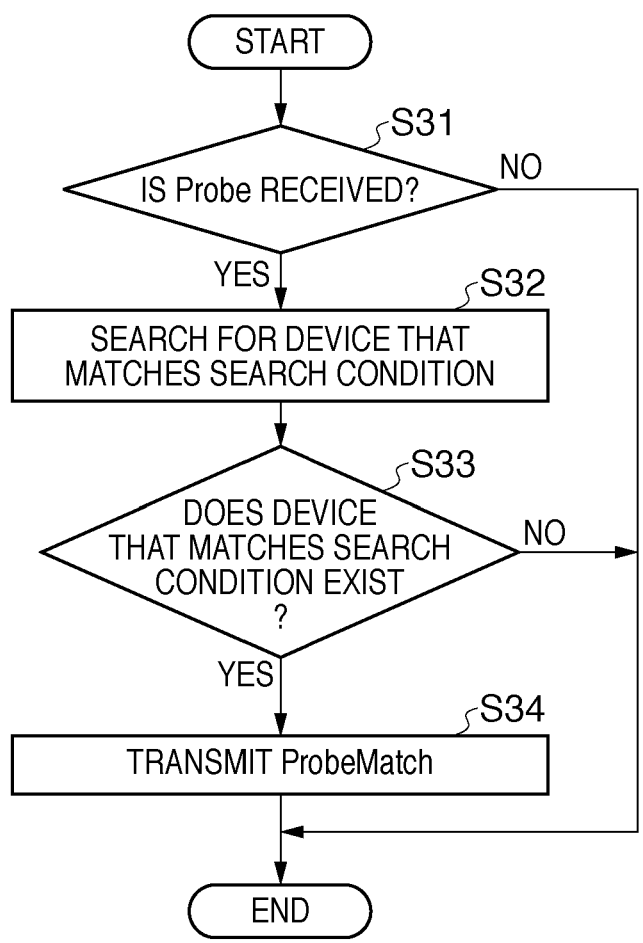
FIG. 10 is a flowchart describing a process where the DP receives a device search request from the PC.

FIG. 10 is a flowchart describing a process where the DP 102 receives the device search request from the client PC 110 according to the first embodiment. A program for performing this process has been loaded into the RAM 203 of the DP 102 at runtime and is executed under the control of the CPU 201 of the DP 102.

First, if the CPU 201 of the DP 102 receives the Probe message (for example, FIG. 9A) from the PC 110 in step S31, the process proceeds to step S32. In step S32, the CPU 201 extracts the <Types> tag from the Probe message and searches the device information table (FIG. 4) stored in the HD 211 for a device that matches the search condition. In step S33, the CPU 201 determines whether a device that matches the search condition exists in the device information table. If a matching device exists, the process proceeds to step S34. In step S34, the CPU 201 transmits a ProbeMatch message as shown in FIG. 11 to the client PC 110.

FIG. 11 is a diagram showing an exemplary ProbeMatch message.

In the ProbeMatch message, a <ProbeMatches> tag contains ProbeMatch sections 1101 and 1102 indicated by <ProbeMatch> tags. Each ProbeMatch section corresponds to one search result, and the example of FIG. 11 shows that the discovery of two devices is returned. In FIG. 11, a URL indicated by <XAddrs> tags in the <ProbeMatches> tag, corresponding to 901 in FIG. 9B, is the IP address of the DP 102.

Returning to FIG. 8, in step S14, the CPU 201 of the client PC 110 determines whether the ProbeMatch message is received. If the ProbeMatch message is received, the process proceeds to step S15. In step S15, the CPU 201 extracts, from the ProbeMatch message, the value of an <Address> tag in an <EndpointReference> tag as the UUID that globally identifies a device. In the example of FIG. 11, two UUIDs are extracted.

The process proceeds to step S16, where the CPU 201 determines whether a record with the same UUID as the UUID extracted in step S15 exists in the device information table (FIG. 4) in the HD 211 of the client PC 110. If such a record does not exist, the process proceeds to step S17, where the CPU 201 adds a new record to the device information table in the HD 211 of the client PC 110. If it is determined in step S16 that such a record exists, the process proceeds to step S21, where the CPU 201 of the client PC 110 extracts version information from the ProbeMatch message received in step S14. In step S22, the CPU 201 determines whether the extracted version information is the same as the version information in the record with the same UUID. If the versions are different from each other, the process proceeds to step S18, and if the versions are the same, the process proceeds to step S23. In step S18, the CPU 201 of the client PC 110 extracts a URL described in the <XAddrs> tag from the ProbeMatch message and unicasts a Get message illustrated in FIG. 7A to the URL. The address indicated by this URL may be the address of the image forming device 101 or the address of the DP 102, depending on the branching in step S12. For example, if the determination in step S12 has resulted in Yes, the device search request has been issued to the DP 102 in step S13 and the ProbeMatch message has been received from the DP 102 in step S14. Therefore, the <XAddrs> tag in the ProbeMatch message describes the IP address of the DP 102. On the other hand, if the determination in step S12 has resulted in No, the process has proceeded to step S20 to multicast the device search request. Then in step S14, the ProbeMatch message has been received from the image forming device 101. Therefore, the <XAddrs> tag in the ProbeMatch message describes the IP address of the image forming device 101.

FIG. 12 is a flowchart describing a process where the DP 102 receives the Get message from the client PC 110 according to the first embodiment. A program for performing this process has been loaded into the RAM 203 of the DP 102 at runtime and is executed under the control of the CPU 201 of the DP 102.

First, in step S41, if the CPU 201 of the DP 102 receives the Get message, the process proceeds to step S42. In step S42, the CPU 201 extracts, from the Get message, the value of the <To > tag as the UUID that globally identifies the device. The process proceeds to step S43, where the CPU 201 determines whether a record with the same UUID as the extracted UUID exists in the device information table (FIG. 4) in the HD 211. If it is determined that such a record exists in step S44, the process proceeds to step S45, where the CPU 201 transmits a GetResponse message as illustrated in FIG. 13 to the client PC 110.

FIG. 13 is a diagram showing an exemplary GetResponse message transmitted from the DP 102 to the client PC 110. This message is generated based on information in the device information table stored in the HD 211 of the DP 102.

In FIG. 13, a Hosted section 1301 indicated by a <Hosted> tag is added below a <Relationship> tag. <Types> specifies "DeviceProxyEventingServiceType," and an <Address> tag describes a URL that is the IP address of the DP 102. As will be described in detail later, the client PC 110 can transmit an event registration request (a Subscribe request) to this URL to issue an event registration request to the device (in this example, the image forming device 101) via the DP 102.

Thus, if the GetResponse is received, the process proceeds to step S19 in FIG. 8. In step S19, the CPU 201 of the client PC 110 updates the relevant record in the device information table in the HD 211 of the client PC 110 based on information in the received GetResponse message. The CPU 201 further stores the XML data of the received GetResponse message in the HD 211 of the client PC 110.

Here, if the CPU 201 of the client PC 110 has transmitted the Get message to the DP 102 in step S18, the GetResponse message to be received will be a message as in FIG. 13 transmitted by the CPU 201 of the DP 102. In FIG. 13, the <Hosted> tag exists in which the <Types> tag specifies "DeviceProxyEventingServiceType."

If the CPU 201 of the client PC 110 has transmitted the Get message to the image forming device 101 in step S18, the GetResponse message to be received will be a message as in FIG. 7B transmitted by the CPU 301 of the image forming device 101. In FIG. 7B, the <Hosted> tag in which the <Types> tag specifies "DeviceProxyEventingServiceType" does not exist. In this case, event registration is directly performed with the image forming device 101 by transmitting an event registration request (a Subscribe request) to a URL ("123456") indicated by "PrinterServiceType" in FIG. 7B. If the ProbeMatch message includes more than one search result as in FIG. 11, the CPU 201 of the client PC 110 repeats the process in steps S15 to S23 until information about all devices is acquired.

Thus, once the client PC 110 acquires the information about the devices, the client PC 110 displays the results on the display unit 210. In this device search, the type of devices to be searched for can be specified by a keyword, for example "MFP" or "Printer." If the type of devices to be searched for is not specified, all devices are searched.

FIG. 14A is a flowchart describing a procedure in which the client PC 110 performs an event registration process for the device discovered in the above-described device search according to the first embodiment. A program for performing this process has been loaded into the RAM 203 of the PC 110 at runtime and is executed under the control of the CPU 201 of the PC 110.

First, in step S51, the CPU 201 of the client PC 110 extracts a URL of a destination of an event registration request from the GetResponse message data stored in the HD 211 of the client PC 110. If the device information has been acquired from the DP 102 in step S18 of FIG. 8, the URL of the destination of the event registration request is the IP address of the DP 102. If the device information has been acquired from the image forming device 101 in step S18 of FIG. 8, the URL of the destination of the event registration request is the IP address of the image forming device 101. The process proceeds to step S52, where the CPU 201 of the client PC 110 transmits a Subscribe request to the URL of the destination of the event registration request.

FIG. 14B is a diagram showing an exemplary Subscribe request transmitted from the PC 110 to the DP 102 in step S52 of FIG. 14A.

A wsa:Filter section 1401 indicates that a notification is desired upon a status change for an event indicated by "PrinterStatusEvent" (upon the occurrence of an event). A wsa:To section 1402 indicates the URL of the service-providing device. This URL corresponds to the URL indicated by the <Address> tag in the <Hosted> tag in which the <Types> specifies "PrinterServiceType" in the GetResponse message acquired in S18 of FIG. 8.

Figure 15:
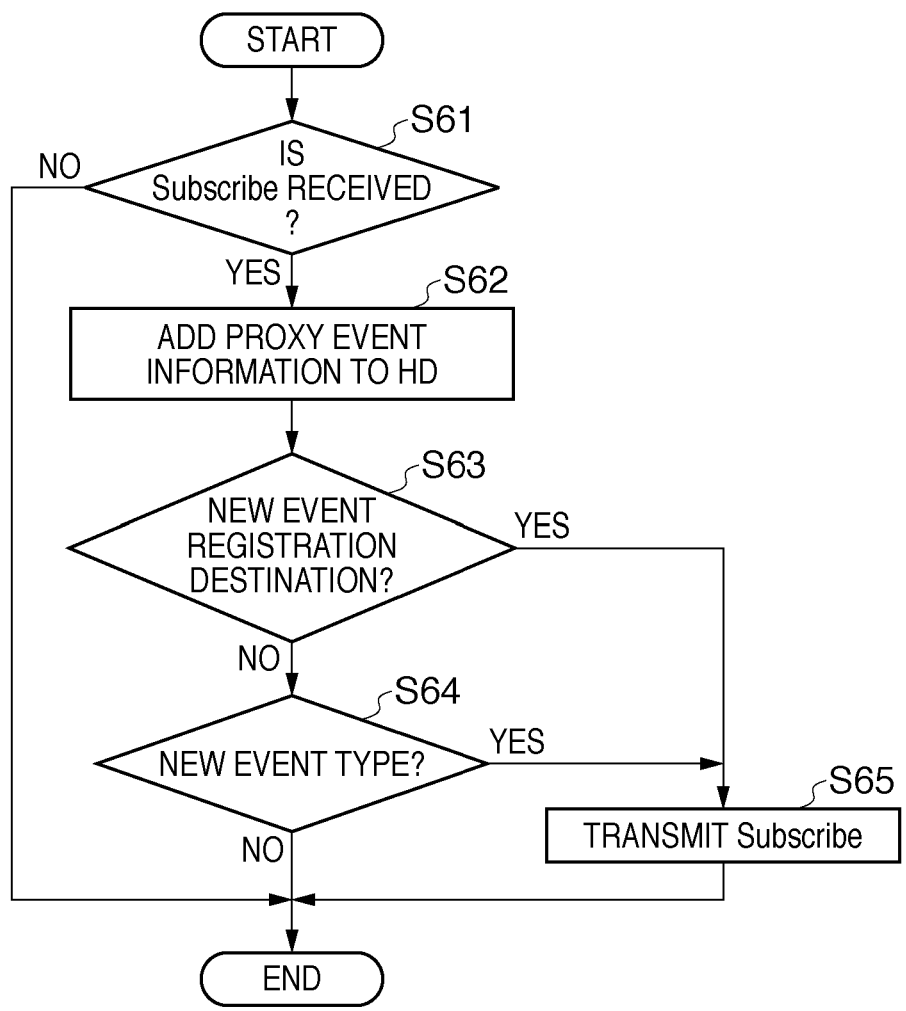
FIG. 15 is a flowchart describing a process of the DP from receiving a Subscribe request from the PC to transmitting a Subscribe request to the image forming device.

FIG. 15 is a flowchart describing a process of the DP 102 from receiving the Subscribe request from the client PC 110 to transmitting a Subscribe request to the image forming device 101 according to the first embodiment. A program for performing this process has been loaded into the RAM 203 of the DP 102 at runtime and is executed under the control of the CPU 201 of the DP 102.

First, in step S61, if the CPU 201 of the DP 102 receives the Subscribe request, the process proceeds to step S62. In step S62, the CPU 201 adds information in the received Subscribe request as proxy event information to a device management table (FIG. 16) (to be described below) held in the HD 211 of the DP 102.

FIG. 16 is a diagram showing an exemplary device management table for event notification held in the HD 211 of the DP 102.

The device information table holds respective pieces of proxy event information as records. Each record includes an ID 1601, an event registration destination URL 1602, an event notification destination URL 1603, and an event type 1604.

The ID 1601 indicates an ID for identifying the proxy event information within the DP 102. The event registration destination URL 1602 indicates a service URL of an event registration destination and corresponds to the information indicated by the wsa:To tag in the FIG. 14B. In FIG. 14B, this is the URL of the image forming device 101. The event notification destination URL 1603 indicates the URL of the client PC 110 that has transmitted the Subscribe request and corresponds to information indicated by a wsa:ReplyTo tag in FIG. 14B. The event type 1604 indicates the type of an event of which a notification is desired, and corresponds to the information indicated by the wse:Filter in FIG. 14B. In this example, this is "PrinterStatusEvent," the occurrence of a change in the status of the image forming device 101. As will be described later, when the DP 102 receives an event of the event type indicated in the event type 1604 from the device indicated in the event registration destination URL 1602, the DP 102 provides a notification of the event to the client (in this example, the PC 110) indicated in the event notification destination URL 1603.

In step S63, the CPU 201 of the DP 102 determines whether the event registration destination URL 1603 in the record added to the device information table is a new URL. If it is determined that the URL is a new URL, the process proceeds to step S65. Even if the event registration destination URL 1603 is not a new URL in step S63, the process proceeds from step S64 to step S65 if the event type 1604 is a new event type in step S64. In step S65, the CPU 201 of the DP 102 transmits a Subscribe request in an XML format as in FIG. 17 to the URL indicated in the event registration destination URL 1603. If the event registration destination URL 1603 is not a new URL in step S63 and if the same event type exists in step S64, a Subscribe request has already been transmitted for the same event type to the same event registration destination URL. Therefore, the process terminates without further operation.

FIG. 17 is a diagram showing an exemplary Subscribe request transmitted from the DP 102 to the image forming device 101.

In this example, the image forming device 101 will notify the DP 102 of an event if a status change occurs for events indicated by "PrintStatusEvent" and "ScannerStatusEvent." Here, the image forming device 101 only has to transmit an event to the DP 102, so that the need to transmit an event to a number of client PCs via the network is eliminated. When the CPU 301 of the image forming device 101 receives the Subscribe request, the CPU 301 stores, in the HD 311 of the image forming device 101, the event type for which a notification should be provided and information about the event notification destination, in association with each other.

Figure 18:
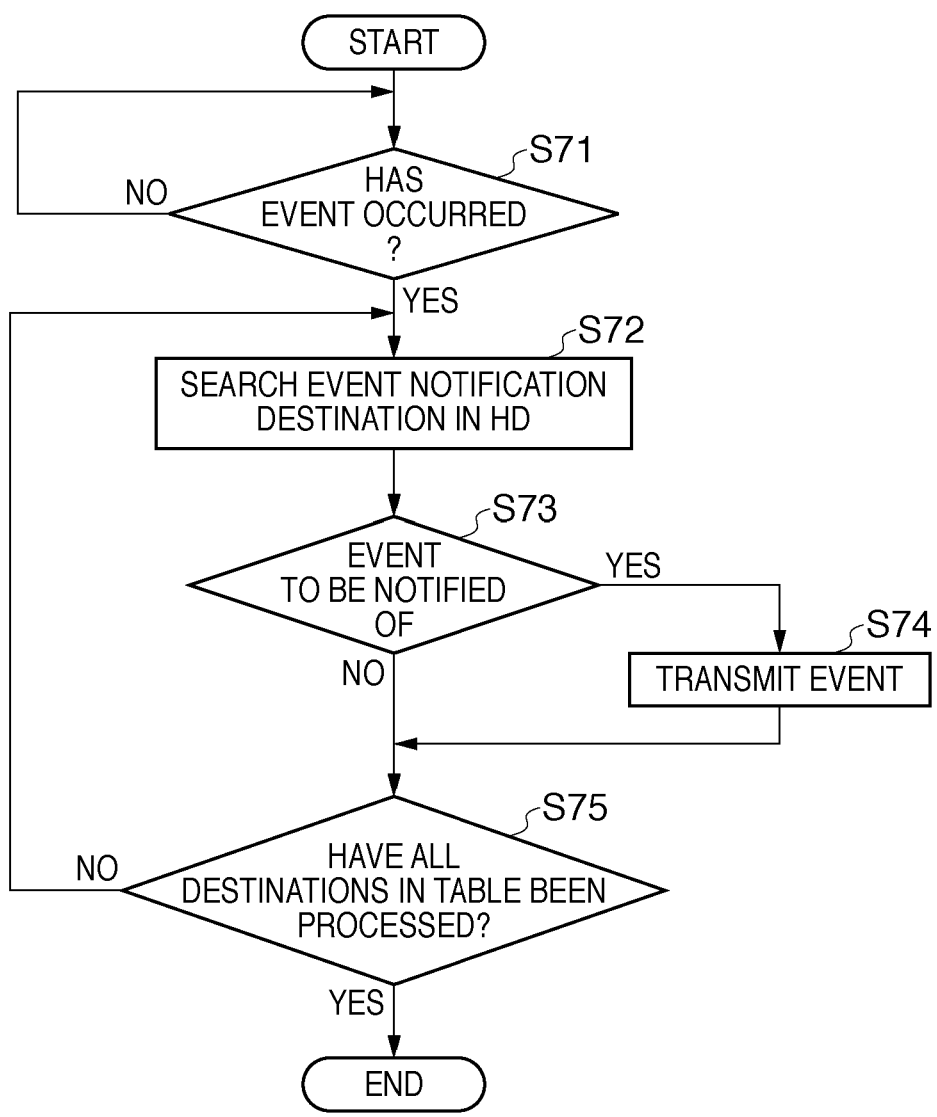
FIG. 18 is a flowchart describing a procedure of a process in the image forming device on the occurrence of an event.

FIG. 18 is a flowchart describing a procedure of a process in the image forming device 101 on the occurrence of an event according to the embodiments. A program for performing this process has been loaded into the RAM 302 at runtime and is executed under the control of the CPU 301. This process starts in response to the occurrence of an event related to a change in the transition status of a job, an event related to error information, an event related to changing a device such as an optional device, or an event related to various setting changes, for example.

First, in step S71, the CPU 301 determines whether an event has occurred. If the occurrence of an event is determined, the process proceeds to step S72, where the CPU 301 searches the event notification destination information and event types stored in the HD 311 of the image forming device 101. The process proceeds to step S73, where the CPU 301 determines whether the event is registered as an event to be notified of. If the event is registered as an event to be notified of, the process proceeds to step S74, where the CPU 301 transmits the event to an event notification destination stored in the HD 311, and the process proceeds to step S75. If the CPU 301 determines in step S73 that the event is not registered as an event to be notified of, the process proceeds to step S75. In step S75, it is determined whether the transmission process to all event notification destinations to be notified stored in the HD 311 has been finished. If not finished, the above process is performed by returning to step S72.

Thus, if the event notification destination to be notified stored in the HD 311 is the DP 102, the image forming device 101 only has to transmit the event to the DP 102 in step S74. This can eliminate the need to transmit the event to a number of client PCs.

Figure 19:
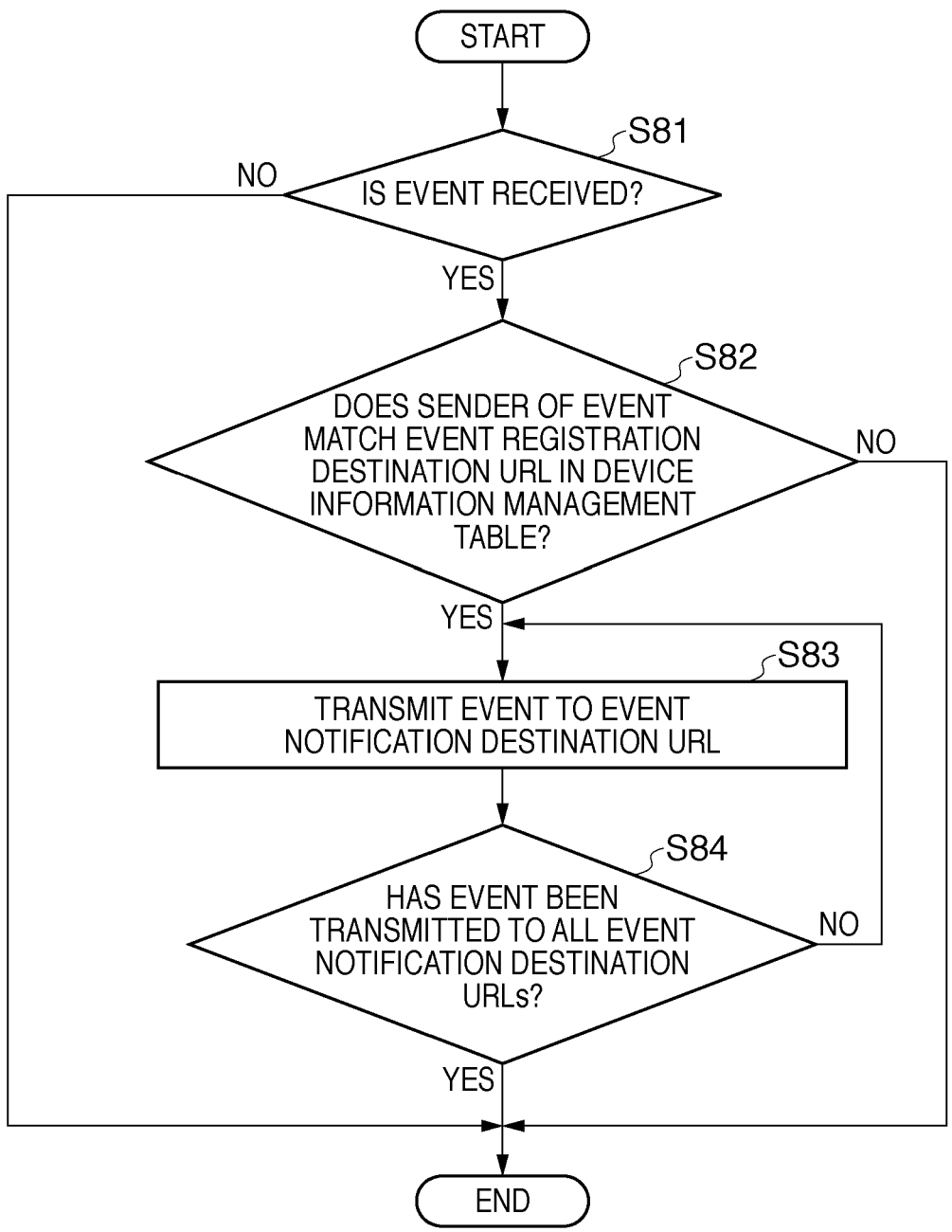
FIG. 19 is a flowchart describing a process of the DP from receiving an event from the image forming device to transferring the event to the PC.

FIG. 19 is a flowchart describing a process of the DP 102 from receiving an event from the image forming device 101 to transferring the event to the client PC 110 according to the first embodiment. A program for performing this process has been loaded into the RAM 203 of the DP 102 at runtime and is executed under the control of the CPU 201 of the DP 102.

First, in step S81, the CPU 201 of the DP 102 determines whether an event is received. If the reception of an event is determined, the process proceeds to step S82, where the CPU 201 of the DP 102 determines whether the sender of the received event is registered as an event registration destination URL in the device information table (FIG. 16) held in the HD 211 of the DP 102. If it is determined that the sender is registered, the process proceeds to step S83. In step S83, the CPU 201 of the DP 102 transmits the event to a URL indicated by the event notification URL 1603 in the same record as the registered event registration destination URL. The process proceeds to step S84, where it is determined whether the event has been transmitted to all event notification destinations if more than one event notification destination URLs are registered for the event registration destination URL. If the event has not been transmitted to all the notification destinations, the process returns to step S83 to transmit the event to the remaining event notification destination URLs. When the event notification has been provided to all the event notification destination URLs in step S84, the process terminates.

Thus, as described above, according to the first embodiment, the client PC 110 transmits an event registration request to the DP 102, and the DP 102 transmits an event registration request in place of the client PC 110 to the image forming device 101. Therefore, on the occurrence of an event in the image forming device 101, the image forming device 101 only has to notify the DP 102 of the event. In this manner, the processing load involved in the event notification of the image forming device 101 as an event notification apparatus can be reduced even if the number of client PCs in the network increases and accordingly the number of client PCs desiring an event notification increases.

[Second Embodiment]

Now, a second embodiment of the present invention will be described. The network configuration, and the hardware configurations of the image forming device 101, the DP 102, and the PC 110 according to the second embodiment are the same as the above-described first embodiment and therefore will not be described.

In the second embodiment, when the image forming device 101 transmits the GetResponse message to the DP 102, the image forming device 101 adds the Hosted section 1301 shown in FIG. 13. In the first embodiment described above, the device information (the GetResponse message) to be transmitted by the DP 102 to the client PC 110 in step S45 of FIG. 12 is modified by the DP 102 to add the Hosted section

1301 as shown in FIG. 13. In the Hosted section 1301, the <Types> specifies "DeviceProxyEventingServiceType," and the <Address> tag describes a URL that is the IP address of the DP 102. Therefore, when the client PC 110 acquires the device information (the GetResponse message) and issues an event notification request to the relevant device, the client PC 110 transmits an event registration request to the DP 102.

Figure 20:
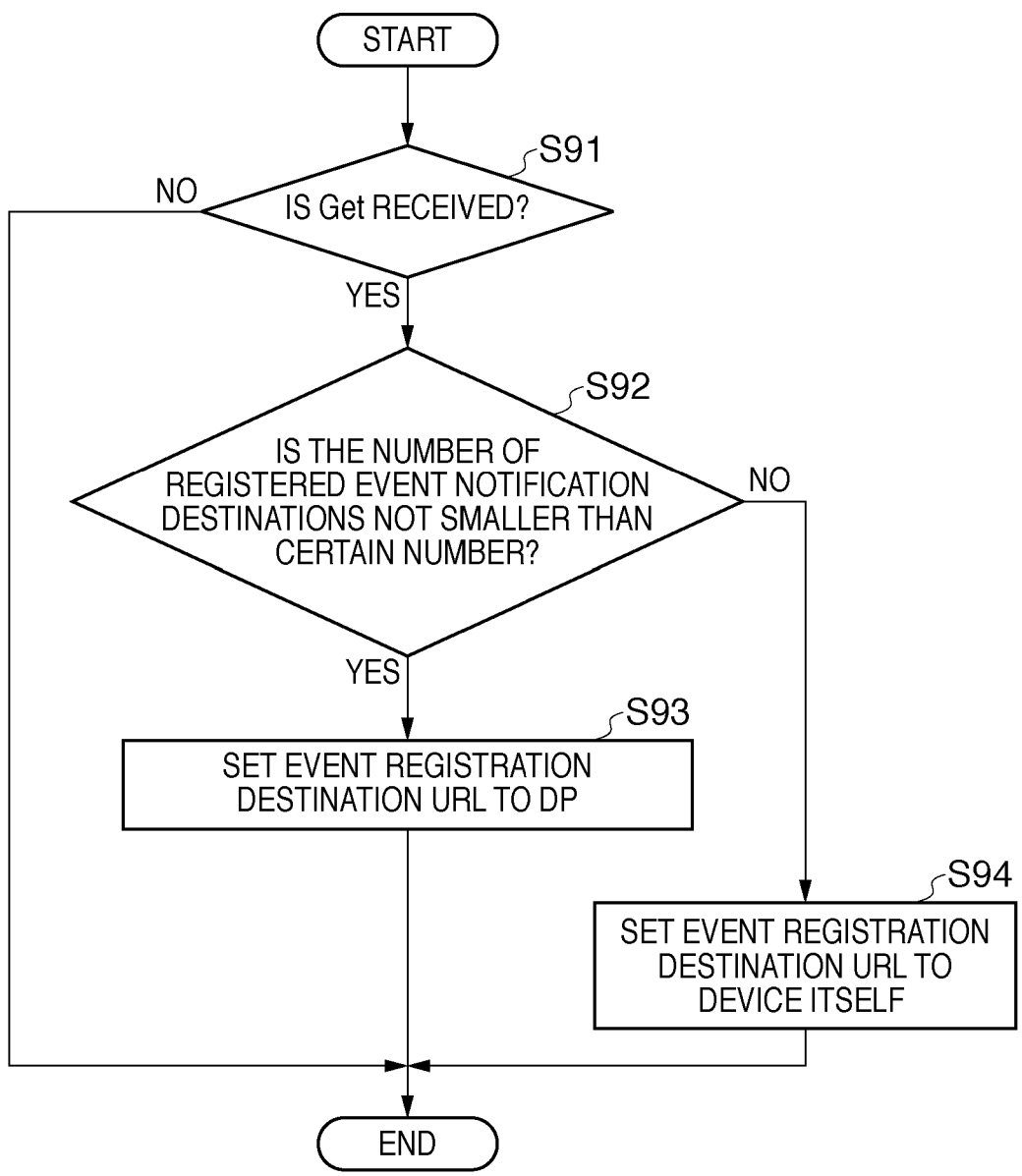
FIG. 20 is a flowchart describing a process of the image forming device from receiving a Get message to transmitting a GetResponse message according to a second embodiment.

FIG. 20 is a flowchart describing a process of the image forming device 101 from receiving the Get message to transmitting the GetResponse message according to the second embodiment. A program for performing this process has been loaded into the RAM 302 at runtime and is executed under the control of the CPU 301.

First, in step S91, the CPU 301 of the image forming device 101 determines whether the Get message is received. If the Get message is received, the process proceeds to step S92. In step S92, the CPU 301 determines the number of event notification destinations registered in the HD 311. If the number is not smaller than a certain number, the process proceeds to step S93. In step S93, the CPU 301 transmits the GetResponse message with the Hosted section 1301 added thereto. If it is determined in step S92 that the number of event notification destinations is smaller than the certain number, the process proceeds to step S94 in which the CPU 301 transmits the GetResponse message only with the Hosted section indicating the device's own service as shown in FIG. 7B. The certain number can be set through the console unit 305 of the image forming device 101.

Thus, the DP 102 receives the GetResponse message in step S5 of FIG. 6. However, in the second embodiment, the GetResponse message already has the Hosted section 1301 added thereto at this point. Therefore, when the DP 102 transmits the GetResponse message to the client PC 110 in step S45 of FIG. 12, the DP 102 can transmit the received GetResponse message without making modifications thereto.

Thus, as described above, according to the second embodiment, if the image forming device 101 as the event notification apparatus determines that the load of the event notification is heavy because of more than a predetermined number of event notification destinations, the image forming device 101 automatically sets the registration destination of event notification to the event proxy notification apparatus. Therefore, the increase of the processing load on the event notification apparatus can be restrained even if the number of event notification destinations increases.

[Third Embodiment]

Now, a third embodiment of the present invention will be described. The network configuration, and the hardware configurations of the image forming device 101, the DP 102, and the PC 110 according to the third embodiment are the same as the above-described first and second embodiments and therefore will not be described. In the third embodiment, the event registration performed by the client PC 110 is switched between the event registration with the DP 102 and the event registration directly with the image forming device 101 depending on whether or not the image forming device 101 as an event registration destination has been discovered by the DP 102. In the first and second embodiments described above, the URL of the event registration destination as shown in the Hosted section 1301 in FIG. 13 is added to the device information (the GetResponse message) to be transmitted by the DP 102 to the client PC 110 in S45 of FIG. 12. In the third embodiment, the URL for use in the event registration with the DP 102 is not acquired from the GetResponse message but stored in the HD 211 of the client PC 110 in advance.

FIG. 21 is a flowchart describing a procedure of a process in which the client PC 110 performs the event registration according to the third embodiment. A program for performing this process has been loaded into the RAM 203 of the PC 110 at runtime and is executed under the control of the CPU 201 of the PC 110.

First, in step S101, the CPU 201 of the client PC 110 determines whether the image forming device 101 as the event registration destination is a device discovered by the DP 102. It is assumed here that the URL of the event registration destination of the DP 102 is registered in the HD 211 of the client PC 110 in advance. If it is determined in step S101 that the image forming device 101 has been discovered by the DP 102, the process proceeds to step S102. In step S102, the CPU 201 of the client PC 110 acquires the event registration destination URL of the DP 102 stored in the HD 211 of the client PC 110, and the process proceeds to step S104. If it is determined in step S101 that the image forming device 101 has not been discovered by the DP 102, the process proceeds to step S103. In step S103, the CPU 201 acquires the event registration destination URL described in the GetResponse message, and the process proceeds to step S104. In step S104, the CPU 201 of the client PC 110 transmits an event registration request to the event registration destination URL.

Thus, as described above, according to the third embodiment, only the image forming device 101 that is an event registration destination discovered by the DP 102 can be set as the event registration destination by the client PC.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-000796, filed Jan. 5, 2010, which is hereby incorporated by reference herein in its entirety.

What is claimed is:

1. An event proxy notification apparatus for notifying a client apparatus of issuance of an event upon receiving the issuance of the event from an event notification apparatus, comprising:

a registration unit that registers, upon receiving a notification request, indicating a type of an event and an event notification apparatus of the event and for requesting an event notification, from a client apparatus, information about the type of the event, the event notification apparatus and the client apparatus from which the notification request is received;

a determination unit that determines, upon receiving issuance of an event from an event notification apparatus, whether the event notification apparatus, the type of the event and the client apparatus that has requested the event notification of the event have been registered by the registration unit, based on the information registered by the registration unit corresponding to the notification request; and an event notification unit that transmits the event to the client apparatus registered by the registration unit if the determination unit determines that the event notification apparatus, the type of the event, and the client apparatus have been registered, wherein the registration unit requests information for the event notification apparatus included in the notification request for the event and extracts the information about the event notification apparatus based on a response from the event notification apparatus to the request.

2. The event proxy notification apparatus according to claim 1, further comprising:

a reception unit that receives a search request for searching an event notification apparatus and an event proxy notification apparatus from the client apparatus; and a unit that searches the event notification apparatus and the event proxy notification apparatus and returns a search result to the client apparatus in response to the search request received by the reception unit.

3. The event proxy notification apparatus according to claim 1, wherein the event notification unit transmits the event to all client apparatuses, registered by the registration unit, that have requested the notification of the event.

4. A method of controlling an event proxy notification apparatus for notifying a client apparatus of issuance of an event upon receiving the issuance of the event from an event notification apparatus, comprising:

registering, upon receiving a notification request, indicating a type of an event and an event notification apparatus of the event and for requesting an event notification, from a client apparatus, information about the type of the event and the event notification apparatus, and the client apparatus from which the notification request is received;

determining, upon receiving issuance of an event from an event notification apparatus, whether the event notification apparatus, the type of the event and the client apparatus that has requested the event notification of the event have been registered in the registering step, based on the information registered in the registering step corresponding to the notification request; and transmitting the event to the client apparatus registered in the registering step if it is determined in the determining step that the event notification apparatus, the type of the event, and the client apparatus have been registered, wherein the registering step requests information for the event notification apparatus included in the notification request for the event and extracts the information about the event notification apparatus based on a response from the event notification apparatus to the request.

5. A non-transitory computer readable storage medium storing computer executable code of a program for causing a computer to perform event proxy notification for notifying a client apparatus of issuance of an event upon receiving the issuance of the event from an event notification apparatus, the program causing the computer to function as an event proxy notification apparatus by executing the steps of:

registering, upon receiving a notification request, indicating a type of an event and an event notification apparatus of the event and for requesting an event notification, from a client apparatus, information about the type of the event, the event notification apparatus, and the client apparatus from which the notification request is received;

determining, upon receiving issuance of an event from an event notification apparatus, whether the event notification apparatus, the type of the event and the client apparatus that has requested the event notification of the event have been registered by the registering step, based on the information registered by the registering step corresponding to the notification request; and transmitting the event to the client apparatus registered by the registering step if the determining step determines that the event notification apparatus, the type of the event, and the client apparatus have been registered, wherein the registering step requests information for the event notification apparatus included in the notification request for the event and extracts the information about the event notification apparatus based on a response from the event notification apparatus to the request.

* * * * *